United States Patent
Maes (10) Patent No.: US 8,688,822 B2
(45) Date of Patent: Apr. 1, 2014

(54) PUSH E-MAIL INFERRED NETWORK PRESENCE

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1249 days.

(21) Appl. No.: 11/481,440

(22) Filed: Jul. 5, 2006

(65) Prior Publication Data

US 2008/0040441 A1 Feb. 14, 2008

(51) Int. Cl.
*G06F 15/173* (2006.01)
*G06F 15/16* (2006.01)

(52) U.S. Cl.
USPC .............................. 709/224; 709/206; 706/21

(58) Field of Classification Search
USPC ............................ 709/224, 204–207; 706/21
See application file for complete search history.

(56) References Cited

U.S. PATENT DOCUMENTS

| | | | |
|---|---|---|---|
| 6,987,840 B1 * | 1/2006 | Bosik et al. | 379/88.17 |
| 7,035,390 B2 | 4/2006 | Elliott | |
| 7,203,294 B2 | 4/2007 | Carnazza et al. | |
| 7,269,162 B1 | 9/2007 | Turner | |
| 7,606,866 B2 * | 10/2009 | Mora | 709/207 |
| 7,620,160 B2 | 11/2009 | Tidwell et al. | |
| 7,668,157 B2 | 2/2010 | Weintraub et al. | |
| 2001/0031641 A1 * | 10/2001 | Ung et al. | 455/456 |
| 2002/0087649 A1 * | 7/2002 | Horvitz | 709/207 |
| 2003/0065788 A1 | 4/2003 | Salomaki | |
| 2003/0206619 A1 * | 11/2003 | Curbow et al. | 379/210.01 |
| 2003/0217142 A1 | 11/2003 | Bobde et al. | |
| 2004/0002958 A1 * | 1/2004 | Seshadri et al. | 707/3 |
| 2004/0003042 A1 * | 1/2004 | Horvitz et al. | 709/204 |
| 2004/0030753 A1 * | 2/2004 | Horvitz | 709/206 |
| 2004/0039630 A1 * | 2/2004 | Begole et al. | 705/11 |
| 2004/0122901 A1 | 6/2004 | Sylvain | |
| 2004/0249776 A1 * | 12/2004 | Horvitz et al. | 706/21 |
| 2005/0021645 A1 * | 1/2005 | Kulkarni et al. | 709/206 |
| 2005/0080867 A1 * | 4/2005 | Malik et al. | 709/207 |
| 2005/0228882 A1 * | 10/2005 | Watanabe et al. | 709/224 |
| 2005/0259802 A1 * | 11/2005 | Gray et al. | 379/201.01 |
| 2005/0273673 A1 * | 12/2005 | Gassoway | 714/45 |

(Continued)

OTHER PUBLICATIONS

U.S. Appl. No. 11/424,451, filed Jun. 15, 2006, Advisory Action dated May 18, 2010, 3 pages.

(Continued)

*Primary Examiner* — Joseph Avellino
*Assistant Examiner* — James Conaway
(74) *Attorney, Agent, or Firm* — Kilpatrick Townsend & Stockton LLP (57) ABSTRACT

The presence of a user or device on a network is inferred without requiring permission or exposure from a service provider or network operator. If updates for a user have been pending past a specified amount of time, the user can be inferred to not be present. If the user has requested updates within that specified time, the user can be inferred to be present. If presence cannot be inferred from past activity, a wake-up event can be sent to the user. The wake-up event can be piggy-backed on an existing protocol in order to have easy access to the user. If the user is present on the network, the user will respond to the wake-up event and the user's presence can be determined. If the user does not respond, it can be inferred that the user is not present. This presence can be provided to a third party.

16 Claims, 8 Drawing Sheets

(56) References Cited

U.S. PATENT DOCUMENTS

| | | | |
|---|---|---|---|
| 2006/0117050 | A1 | 6/2006 | John et al. |
| 2006/0190117 | A1 | 8/2006 | Weczorek et al. |
| 2006/0248185 | A1* | 11/2006 | Morris .......................... 709/224 |
| 2007/0027921 | A1* | 2/2007 | Alvarado et al. ........... 707/104.1 |
| 2007/0081640 | A1* | 4/2007 | Jachner ...................... 379/88.16 |
| 2007/0124393 | A1 | 5/2007 | Maes |
| 2007/0153709 | A1 | 7/2007 | Choi |
| 2007/0162343 | A1 | 7/2007 | Landesmann |
| 2007/0233859 | A1 | 10/2007 | Zhao et al. |
| 2007/0291859 | A1 | 12/2007 | Maes |
| 2008/0034367 | A1* | 2/2008 | Patrick et al. ................. 718/101 |
| 2008/0313329 | A1 | 12/2008 | Wang et al. |
| 2009/0177601 | A1* | 7/2009 | Huang et al. .................... 706/16 |
| 2011/0141948 | A1 | 6/2011 | Maes |
| 2011/0142209 | A1 | 6/2011 | Maes |
| 2011/0185029 | A1* | 7/2011 | Jain et al. ...................... 709/207 |
| 2013/0239182 | A1* | 9/2013 | Pierson et al. .................... 726/4 |

OTHER PUBLICATIONS

U.S. Appl. No. 11/424,451, filed Jun. 15, 2006, Office Action dated Oct. 19, 2010, 27 pages.

U.S. Appl. No. 11/424,451, filed Jun. 15, 2006, Final Office Action dated Mar. 18, 2011, 18 pages.

U.S. Appl. No. 11/424,451, filed Jun. 15, 2006, Advisory Action dated May 31, 2011, 3 pages.

U.S. Appl. No. 11/424,451, filed Jun. 15, 2006, Final Office Action dated Jan. 19, 2012, 20 pages.

U.S. Appl. No. 11/424,451, filed Jun. 15, 2006, Office Action dated Aug. 9, 2011, 19 pages.

E-Mail Notification, Open Mobile Alliance Ltd., Candidate Version 1.0, Jun. 14, 2004, 21 pages.

Graham, Steve et al., Publish-Subscribe Notification for Web services, Akamai Technologies et al., Version 1.0, Mar. 5, 2004, 19 pages.

Leion, Henrik, Presence Aware Software Using SIP, White Paper, Enea Epact AB, Teknikringen 8 SE-58330 Linkoping, Feb. 2005, 10 pages.

Synchronizing and Managing Mobile Devices, iAnywhere Solutions, Inc., One Sybase Drive, Dublin, CA 94568-7902, www.iAnywhere.com, 8 pages, Mar. 2006.

Understanding SIP, Today's Hottest Communications Protocol Comes of Age, White Paper, Ubiquity Software Corporation, Limited, www.ubiquitysfotware.com, 2004, 6 pages.

U.S. Appl. No. 11/424,451, filed Jun. 15, 2006, Non-Final Office Action dated Dec. 8, 2008, 20 pages.

U.S. Appl. No. 11/424,451, filed Jun. 15, 2006, Final Office Action dated May 11, 2009, 20 pages.

U.S. Appl. No. 11/424,451, filed Jun. 15, 2006, Non-Final Office Action dated Sep. 18, 2009, 28 pages.

U.S. Appl. No. 11/424,451, filed Jun. 15, 2006, Final Office Action dated Mar. 11, 2010, 27 pages.

U.S. Appl. No. 12/957,709, Final Office Action mailed on Jun. 26, 2013, 19 pages.

U.S. Appl. No. 12/957,726, Non-Final Office Action mailed on Oct. 3, 2013, 12 pages.

U.S. Appl. No. 12/957,709, filed Dec. 1, 2010, Non-final Office Action dated Dec. 18, 2012, 32 pages.

* cited by examiner

PUSH E-MAIL INFERRED NETWORK PRESENCE

BACKGROUND OF THE INVENTION

Embodiments in accordance with the present invention relate generally to the presence of a user, device, or client relative to a device, system, or network, and more particularly to inferring a current presence of a user.

"Presence" can be defined as the technology and/or information that provide for the location and identification of a device whenever that device, and/or a user of that device, is connected or patched in to a network. For example, a user of a cell phone can be considered to be "present" when connected to a network or communicating over a cellular network. A user of a PDA, cell phone, or computer can be considered to be present when transferring data over a wireless network, a user of a personal computer can be considered to be present when streaming music over an Internet connect, and so forth.

Presence is determined in multiple ways, but in general a principal publishes a presence document, as well as updates of the presence document, which can include information such as presence attributes and values. This publishing is typically done to a server on the network. A "principal" is an entity having an identity, and which is capable of providing consent and other data so that authenticated actions can be done on behalf of the principal. A principal can include, for example, an individual user, a group of individuals, a corporation, service enablers and/or applications, system entities, and other legal entities. Presence then is a transient state of a principal that can be used by other principals to make a decision in real-time about how to best communicate with the first principal. For example, if user A is subscribed to the presence of user B, and user B wants to communicate with user A at a given instant, user B can make a decision in real-time depending upon the presence information of user A. For example, user B can determine whether a web-conference can be started at that instant (e.g., if A is available), of if a web conference should be scheduled at a later time.

Others typically subscribe to the presence, or to certain attributes of the presence for some principals. When any of these presence attributes changes, the information is passed to the appropriate subscribers. In addition, filters or policies may apply, as may be set by parties such as the principal, an administrator, or the subscribers, for example, which filter and/or modify the set of attributes or updates that are received.

Various systems and communications networks are able to provide current presence information related to users of those systems and/or networks. Today, presence typically is available as part of a communication application such as instant messaging (IM), voice chat (e.g., SKYPE), video chats or Push to Talk over Cellular (PoC). For example, an IM client can detect presence based on keyboard activity or other such use. Similarly, a cellular or other telephone service can detect presence based on a condition of a telephone, such as a phone being "off the hook" in PBX or call center applications.

Determinations of presence are relatively instantaneous and made in real-time. Real-time presence collected about a user describes, for example: user-defined status as provided by the user (e.g., "on," "available," "busy," etc.); registration, data, and call state that can be captured from the network; and application state such as the channel and/or device from which the presence was collected (e.g. Web, desktop, phone, or mobile device or channel). Presence knowledge can be desirable for a variety of different situations, such as an employer wishing to know if an employee is on the network, or a service attempting to determine whether a subscriber is connected to the network.

A problem with receiving real-time presence information, however, is that when the presence is captured by the network of a service provider, the network must expose this presence to the person, application, or entity requesting the presence information (i.e. presence subscribers). While services such as Parlay APIs or Parlay X Web services, according to a specification set forth by the multi-vendor consortium the Parlay Group, provide such presence information for subscribers, many service and network operators do not implement such a service, and even fewer expose or allow subscriptions to this information for third party service providers or enterprises.

It therefore is desirable to develop a way to obtain network presence information that does not require permission, access, or exposure from a network operator or service provider.

BRIEF SUMMARY OF THE INVENTION

Systems and methods in accordance with embodiments of the present invention can infer network presence without the need for permission, access, or exposure from a network operator or service provider. Presence can be inferred by examining the interaction between a user, client, application, or device with a service or application available on the network. This can include checking whether a user interacts with an application, thereby proving the presence of the user on a network by the reaction of the user or user device to an event such as a notification or request.

In one embodiment, a service available on the network maintains an update queue for the user, which can contain any update, or information relating to a change or update, since a user last accessed, utilized, and/or synchronized with the service. When a request for presence information is received for the user, such as from a third party, the update queue can be checked to determine whether there are pending updates in the queue. The network presence for the user can be inferred based on whether there are updates for the user in the queue. In one embodiment, if there are updates pending in the queue then the user can be inferred to not be present. In another embodiment, the updates must be pending in the queue for at least a specified length of time before a user is inferred to not be present. The absence of pending updates can be used to infer that the user is present, or that the presence cannot be determined. A response can be sent to the third party indicating the inferred presence of the user.

In another embodiment, a service available on the network maintains log of user activity, which can contain all user activity, only the last user activity, or activity within a recent period of time. When a request for presence information is received for the user, such as from a third party, the activity log can be checked to determine when the user last interacted with the service. The network presence for the user can be inferred based on the length of time since the last user interaction listed in the activity log. If there is at least one recent activity listed in the log then the user can be inferred to be present. The absence of recent activity can be used to infer that the user is not present, or that the presence cannot be determined. A response can be sent to the third party indicating the inferred presence of the user.

In another embodiment, a service available on the network is capable of sending an update or other notification to a user. When a request for presence information is received for the user, such as from a third party, the service can send a notification to the user, regardless of whether there are items of which the user is to be notified. The network presence for the user can be inferred based on whether the user responds to the notification, such as by sending an update request to the service. If the user responds to the notification, the user can be inferred to be present. The absence of a response within a specified amount of time of the notification can be used to infer that the user is not present. A response can be sent to the third party indicating the inferred presence of the user.

Some embodiments utilize a combination of activity logs, update queues, and notifications to infer network presence. An attempt can first be made to infer network presence based on the activity log and/or update queue, with a notification only being sent if presence cannot otherwise be inferred.

The service can be any appropriate service, such as an e-mail, personal information management, or other application or service. In certain embodiments, the service is a push service operable to push items or notifications to a user, device, application, and/or client, such as a push e-mail service that runs on a push server. A presence server can be used to interact with a third party requesting presence information, and can request information and/or action from the push server as described above. The presence server can use this information and/or action to infer a network presence for a user and send this presence to the third party requesting the presence information. The presence server also can send any address and network information for the user based on where the push succeeded or where the request or response comes from. Utilizing the existing service allows the presence server to determine presence without first getting authorization from a network operator or service provider, or requiring the user to install additional software or otherwise interact with the presence server. In fact, the presence server can operate independently and even unknown to the user.

Other embodiments will be obvious to one of ordinary skill in the art in light of the description and figures contained herein.

BRIEF DESCRIPTION OF THE DRAWINGS

Various embodiments in accordance with the present invention will be described with reference to the drawings, in which:

FIGS. 4(*a*) and (*b*) illustrate steps for a wake-up notification process that can be used in accordance with one embodiment of the present invention;

DETAILED DESCRIPTION OF THE INVENTION

Systems and methods in accordance with various embodiments of the present invention can overcome the aforementioned and other deficiencies in existing presence detection systems and services by inferring network presence of a user, device, or other such entity. In one embodiment, network presence is determined using an application or service that causes the client to interact with a server located in a third party service provider domain on in the enterprise domain (i.e., any domain that tries to collect the presence). Third party service providers or enterprise systems then can access network presence without having to add a dedicated presence client or an application-integrated presence client. In another embodiment where an application or service involves user interaction, the detection of user activity relating to that application or service is used to determine user presence. Embodiments in accordance with the present invention can use this and other information to infer current network presence, as described and suggested elsewhere herein.

Figure 1:
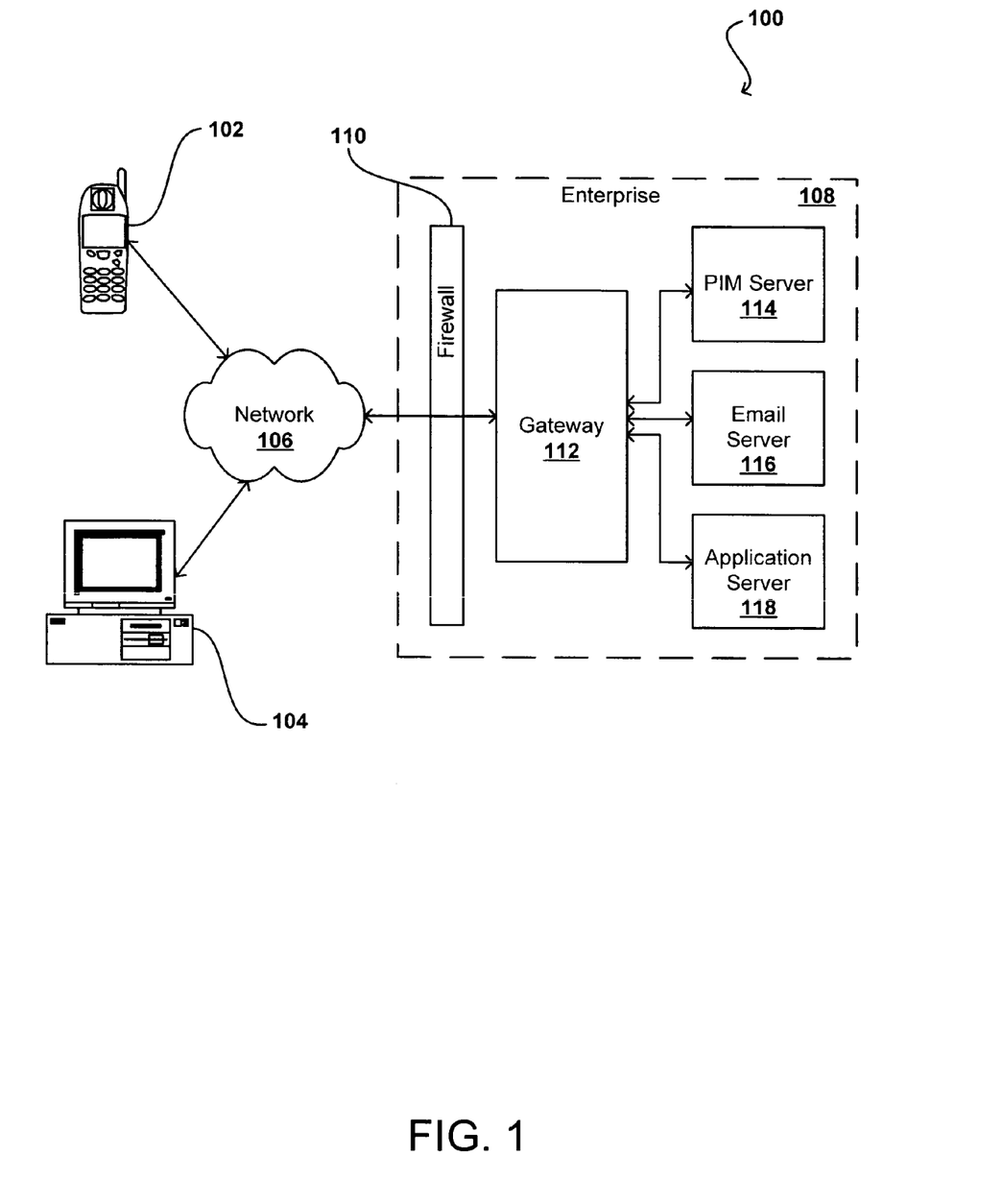
FIG. 1 illustrates components of a computerized network that can be used in accordance with one embodiment of the present invention.

A system 100 for inferring network presence independent of a network service provider in accordance with one embodiment is shown in FIG. 1. In this system 100, a user device 102 is able to connect to a network 106. In this example the user device is a cell phone operable to connect to a cellular network, but it should be understood that the user device can be any appropriate device capable of connecting with a network, including devices such as personal computers (PCs), personal data assistants (PDAs), portable computers, handheld computers, computer terminals, video game systems, wireless devices, and any other such device. Accordingly, the network 106 can include any appropriate network operable to support such devices, including networks such as internets, intranets, extranets, wireless networks, cellular networks, satellite networks, data networks, and any other appropriate network, system, or service. In certain cases, such as for cell phones having Internet or e-mail capability, the network 106 can actually include a combination of networks, such as a cellular network and an Internet-based network, allowing the cell phone to transfer data to and from an Internet-based source, for example. Many other devices, networks, and combinations would be apparent to one of ordinary skill in the art in light of the teachings and suggestions contained herein.

A third party device 104, or third party system or service, also can connect to the network 106. This third party device can include, for example, devices, systems, services, and applications for which it is desirable to obtain information about the presence of the user or user device 102 relative to the network 106. For simplicity, the specification often will refer to determining the presence of a user or user device, but it should be understood that these are only examples and that presence can be determined for a user, user device, client, application, or any other appropriate entity, device, module, or component. The network 106 can include a network that is provided by, maintained by, or otherwise utilized by the third party, which can be separate from, but in communication with, the network for which presence is determined for the user device 102.

A system or device, such as an enterprise system 108 capable of providing, hosting, or allowing access to at least one service or application for the user device 102, also can connect to the network 106, and can communicate with both the user device 102 and the third party device 104. In this example, the enterprise system 108 includes a gateway 112 behind a firewall 110, as known in the art, which provides access to authorized users, applications, and/or devices to a variety of backend systems. In this embodiment the gateway 112 provides access to a personal information manager (PIM) server 114, an email server 116, and an application server 118. Each of the PIM server 114, email server 116, and application server 118 can send a request, message, or other packet of information to the user device 102, which can cause the user, the user device, and/or a client on the user device to react in some way that can be detected by the enterprise system 108.

In such a system, causing the user device 102 to contact or send information back to the enterprise system 112, such as back to the appropriate server 114, 116, 118, can allow for a determination of network presence without obtaining access or approval from a network operator for presence information. For example, the PIM server 114 can send a notification to the user device 102 that an update to a user calendar has occurred. If the user device is present on the network, the user device will receive the notification and can automatically (or manually depending on the application, user preferences, etc.) contact the PIM server 114 to receive the calendar update and any other update for the user device 102 from the PIM server 114. If the user device is not on the network, the user device will not respond to the notification. In this case, the user device will only respond to the notification when the device re-connects to the network. Whether the user device responds to that notification can infer whether the user device is present on the network.

For example, in a first embodiment a server such as a PIM server 114 can maintain a queue of information for each user device 102. When a user device 102 contacts a PIM server 114, any new information for the user device can be transmitted such that the PIM data on the user device is synched with the PIM data for the user device in a database in communication with the PIM server 114. For each update after this synchronization, a queue or list of information or updates can be maintained by the PIM server for the user device, so that when the user device requests updated information the PIM server can quickly send only the information in the queue needed to re-sync the PIM data. A third party device 104, user, or application wishing to determine the presence of the user device 102 can subscribe to a service provided by the enterprise system 108, whereby a third party device, for example, can request presence information from the enterprise 108. The PIM server can check the queue for the user or user device, and can determine whether there are pending items in the queue. If there are pending items, the PIM server 114 can send a notification that the user or user device is not present. If there are pending items, but the items were recently added to the queue such that a present user or user device might not yet have requested the updates, the PIM server can send a notification that the presence of the user cannot be determined.

It is possible, however, that there is no information in the queue but the user device is not present. In one embodiment, the PIM server sets a time limit for inferring network presence, such as five minutes after requesting an update. The PIM server can store information about the last synchronization, such as the time of the last synchronization request, whereby the PIM can send a response that the user is present if the last synchronization occurred within that time limit. The PIM server then can send a response that the user is not present (or it cannot be determined if the user is present) if the last synchronization was more than the time limit in the past, and there are no new updates in the queue. In services such as email where there typically are frequent updates, it might not be necessary to store and check a time limit, but only infer presence based on whether there are messages pending for a user or user device. For applications or services which might have very low traffic, it can be desirable to utilize a time limit as a synchronization might happen relatively infrequently such that presence cannot accurately be inferred. One can also send a dummy wake up even or notification to see if the user or client will react and get to the server or application.

In another embodiment, the enterprise system 108, or any appropriate server or service contained therein, can include code to maintain a log of user activity. For example, the enterprise system allows subscribers to a presence service to input users or user devices to be monitored. Each time a monitored user or user device makes contact with the enterprise system, thereby passing through the gateway 112, the enterprise can write that information to an activity log, data table, or other appropriate location. When a third party wishes to receive presence information for that user, the third party simply sends a request for presence information for that user to the enterprise system 108, which checks the log or other storage location for user activity. In other embodiments, a third party can subscribe to the presence and be notified when the presence of a user changes, such as is indicated by an update to an activity log, for example. In one embodiment, the enterprise system sends back the time of the last recorded activity, in order for the third party to control the inference of presence. In another embodiment, the enterprise system determines the time since the last activity, and infers network presence using a time limit or other approach described elsewhere herein. If a time limit is used, in this or any other embodiment, that time limit can be configurable, by any appropriate entity such as the enterprise, service provider, or third party. The enterprise can allow each third party to set a limit on how long to infer presence after an activity, e.g. before the presence expires. The selection and configuration of times for expiring past presence hints are described, for example, in co-pending U.S. patent application Ser. No. 11/424/451, filed Jun. 15, 2006, entitled "Past Presence Hints," which is hereby incorporated herein by reference.

In one embodiment, the activity log contains an entry for each instance of activity, a subset of activities, or a last particular number of activities for each user. In another embodiment, the log only contains an entry for the last activity for each user. In another embodiment, the list only contains an entry for the last activity for a user if that that activity occurred within the set time limit. In such an embodiment, if the user has an entry in the log then the user can be inferred to be present. If the user does not have an entry in the log, then the user can be inferred not to be present.

Some of these embodiments do not impose at all on the user device, and impose very little on the network and enterprise system, but only offer a certain level of reliability. A method in accordance with one embodiment infers actual network presence through the use of "wake-up" events or other notifications that should induce a reaction by the user, which can be detected by the server. A wake-up event, as it is referred to herein, is any type of notification sent to a user for purposes of eliciting a response, in most cases without any actual change, update, or other reason for sending the notification. For example, a PIM server can send a notification to a user that there is updated information available that the user should retrieve. Notifications are common, particularly for mobile applications and devices where it is undesirable to periodically check a server for updates due to factors such as data transmission fees, bandwidth, connectivity, and other issues. If the user is present on the network, the user will send a request for the update. When the request comes into the PIM server, the PIM server can check an update log, list, queue, or other update storage mechanism or indicator, and find that the user information is still current with the PIM information available to the PIM server. Depending on the implementation, the PIM server can send a response to the user that the user has the current information, that there is no update, and empty update, any other appropriate response, or no response at all. If the user sends a request for update, that information can be used to determine the presence of the user on the network. If the user does not request the update after a certain period of time, then it can be inferred that the user is not present on the network.

There are multiple advantages to using wake-up events. For example, a wake-up event can determine an actual presence of the user on the network in real time if the user responds to the wake-up event. This actual presence will tend to be more accurate than presence inferred based on items in a queue, past network activity, or other such approaches described herein. Further, a wake-up event can "piggy-back," utilize, or sit on top of existing technology, such as notifications from PIM, email, and application servers, such that actual presence and/or inferred presence can be determined using systems that are already available and in use, and that do not require authorization or even knowledge by the network operator or service provider.

Other embodiments utilize a combination of features of the above embodiments. In one such embodiment, a server such as a PIM server that receives a presence request for a user from a third party first checks a queue of information to see if the user has not been requested updates for a period of time, such that the user not being present on the network can be inferred. In another embodiment, the system can first check a listing, table, log, or other indicia of past connectivity or activity on the network for a user to infer whether the user is present on the network. This can be done similarly for presence services. Some embodiments might use a combination of both approaches.

If none of these approaches is able to determine the presence of the user, such as where there are no items in the queue but the user last checked the queue more than a specified amount of time previous to the request, then the system can utilize a wake-up even or other notification. The notification method is always used in one embodiment, even when the other cases work or instead of the other steps. It is also an option alone or in any combination with above. While this will add a little extra processing on the back-end systems, such an approach can drastically cut down on the transfer of data between the enterprise and the user device, which can be desirable for users of mobile devices, for example. Further, if the user has updates that have been in the queue for a long time, the presence of the user on the network can be inferred instantaneously. In the case of a wake-up event, it can be necessary to wait a certain amount of time to provide the user an opportunity to request the update even if the user is present on the network.

In other embodiments, the third party, user, enterprise, or other appropriate party can select whether or not to always send a wake-up event, or whether to first attempt to infer the presence of the user. This can be set for all users, particular users, specific requests, or any other appropriate selection as would be apparent to one of ordinary skill in the art.

Push IMAP Embodiment

An example of an implementation of such a system will be described with respect to an IMAP-based email system, although other push email systems can be used as would be apparent to one of ordinary skill in the art. IMAP (Internet Message Access Protocol) refers to a standard method of accessing e-mail from a mail server, which permits a client email program to access remote message stores as if those stores were locally (i.e., without the need to transfer messages or files back and forth between the client and the server). In the mobile context, where it is desirable to push information as discussed above instead of having the client periodically request any updates, the system can be a push email-enabled IMAP server, which can be based upon a Push-IMAP Protocol (P-IMAP) as submitted to the Internet Engineering Task Force (IETF). The P-IMAP protocol provides for a mechanism to be embedded in a push email application, which notifies a client or user device when a new e-mail message arrives, or when there is another change in the state of an email folder for the client or user device. The client or user device receiving the notification then can send a request for the update to the P-IMAP server. This approach can be deployed without a dependency on the operator network, and can interact with a mobile client, for example, using any appropriate connectivity (such as HTTP or TCP connectivity) to obtain push e-mail-based presence in an enterprise or other appropriate domain. A complete mobile push mail solution can also utilize other appropriate standards such as the Data Sync, client provisioning, and device management standards set forth by the Open Mobile Alliance (OMA). Other produces such as the Oracle Collaboration Suite, available from Oracle International Corporation of Redwood Shores, Calif., can offer a complete end-to-end solution for Mobile Push Mail and PIM, upon which inferred presence can be based.

Push mail provides for real-time, always-on push capability. A P-IMAP-based mobile push mail solution provides an end-to-end secure, behind-the-firewall server solution to real-time mobile push mail to all mobile devices, in particular always-on (as well as other) devices. Mobile push mail solutions push email to mobile devices in real time without requiring any user intervention. P-IMAP provides cradle-free, continuous, two-way synchronization between the P-IMAP server and the P-IMAP client. This continuous two-way real-time solution ensures that any changes on a mobile device (e.g., delete an email, respond to an mail, change status from read to unread, etc.) are wirelessly synchronized with the email server in real-time, according to the user's preferences. Similarly, new e-mail messages and any other changes at the e-mail server are wirelessly reflected on the mobile device in real-time, according to user's preferences.

Figure 2:
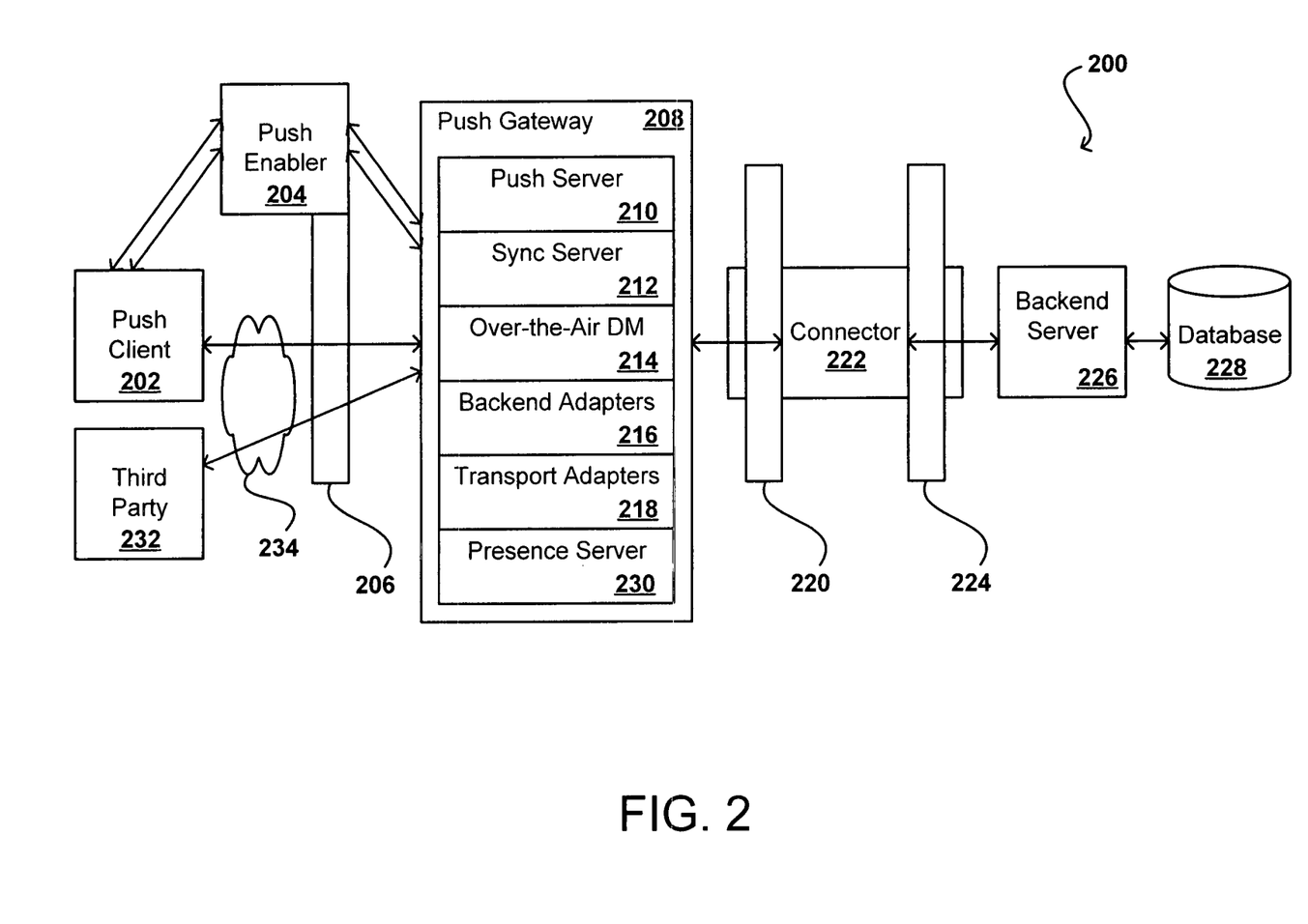
FIG. 2 illustrates a push-email system that can be used n accordance with one embodiment of the present invention.

An exemplary P-IMAP configuration 200 is shown in FIG. 2. A P-IMAP mobile push mail environment in this embodiment includes four key components: a push gateway 208, at least one push client 202, a push enabler 204, and a push mail connector 222. This diagram is simplified for understanding, and it should be understood that a number of other components and/or combinations could be used as would be apparent to one of ordinary skill in the art in light of the teachings and suggestions contained herein. The configuration 200 also can include at least a first firewall 206 between the push gateway and the outside network, whereby only authorized clients can access the gateway and any back-end systems 226 and databases 228. There also can be additional firewalls in the system where appropriate for security and/or access control, such as firewalls 220, 224 on either side of the push connector 222. The gateway also can include any adapters 216 needed to communicate with the back-end servers, systems, and/or devices.

A P-IMAP gateway enables push email on the server side by notifying P-IMAP clients 202 with in-band or out-of-band notifications when needed as prescribed by P-IMAP and the settings, which can be set by the administrator, user, and/or any other appropriate party. In-band notifications are sent via the P-IMAP gateway through an existing P-IMAP connection, and out-of-band notifications are sent via a notification server, or "push" server 210, which sends the appropriate type of notification by relying on a driver architecture to find the appropriate notification engine, such as a short message service center (SMS-C), to send the notification outside the data connection. The notifications can be sent by any appropriate service such as short message service (SMS), multimedia message service (MMS), wireless application protocol (WAP) push services, instant messaging (IM), or SyncML, or by using session initial protocol (SIP) notifications or user datagram protocol (UDP) notifications. Additional notification channels could be added by implementing appropriate drivers in the push server. The push gateway 208 can securely interact with the push client 202 and any third party 232 via the P-IMAP protocol over an appropriate transport, and can interface with the email server 226. Any appropriate transport can be used, with additional transports being implemented through transport adapters 218 on the gateway 208.

The push client 202 provides a user with the mobile push mail experience, including an e-mail application and an e-mail user interface. The push client 202 reacts to push notifications as prescribed by P-IMAP settings, user preferences, and/or client settings. The push client 202 interfaces with the push gateway 208 via the P-IMAP protocol over an appropriate transport. The push client 202 can have the appropriate permissions to pass through any firewalls between the client and the gateway. A push connector 222 can be used to allow the push gateway 208 to interact with a back-end email server 226 (or other appropriate server). The e-mail server can be any appropriate email server, such as an IMAP4.0-based server; a POP3-based server; IBM® Lotus® Domino® Server available from International Business Machines Corporation of Armonk, N.Y.; Microsoft® Exchange Server available from Microsoft Corporation of Redmond, Wash.; or a GroupWise® server available from Novell® of Waltham, Mass. The push connector also can allow the gateway to communicate with the email server through any firewalls positioned therebetween.

At least one mobile push enabler 204 can be used to allow the push gateway 208 to notify a push client 202 out-of-band, or outside the P-IMAP connection. The push enabler 204 can sit on top of the firewall 206 for port management. The push enablers also can be used to provision over-the-air push email clients and parameters, as well as to manage the mobile devices. The gateway 208 can include any appropriate modules for over-the-air device management 214.

Figure 3:
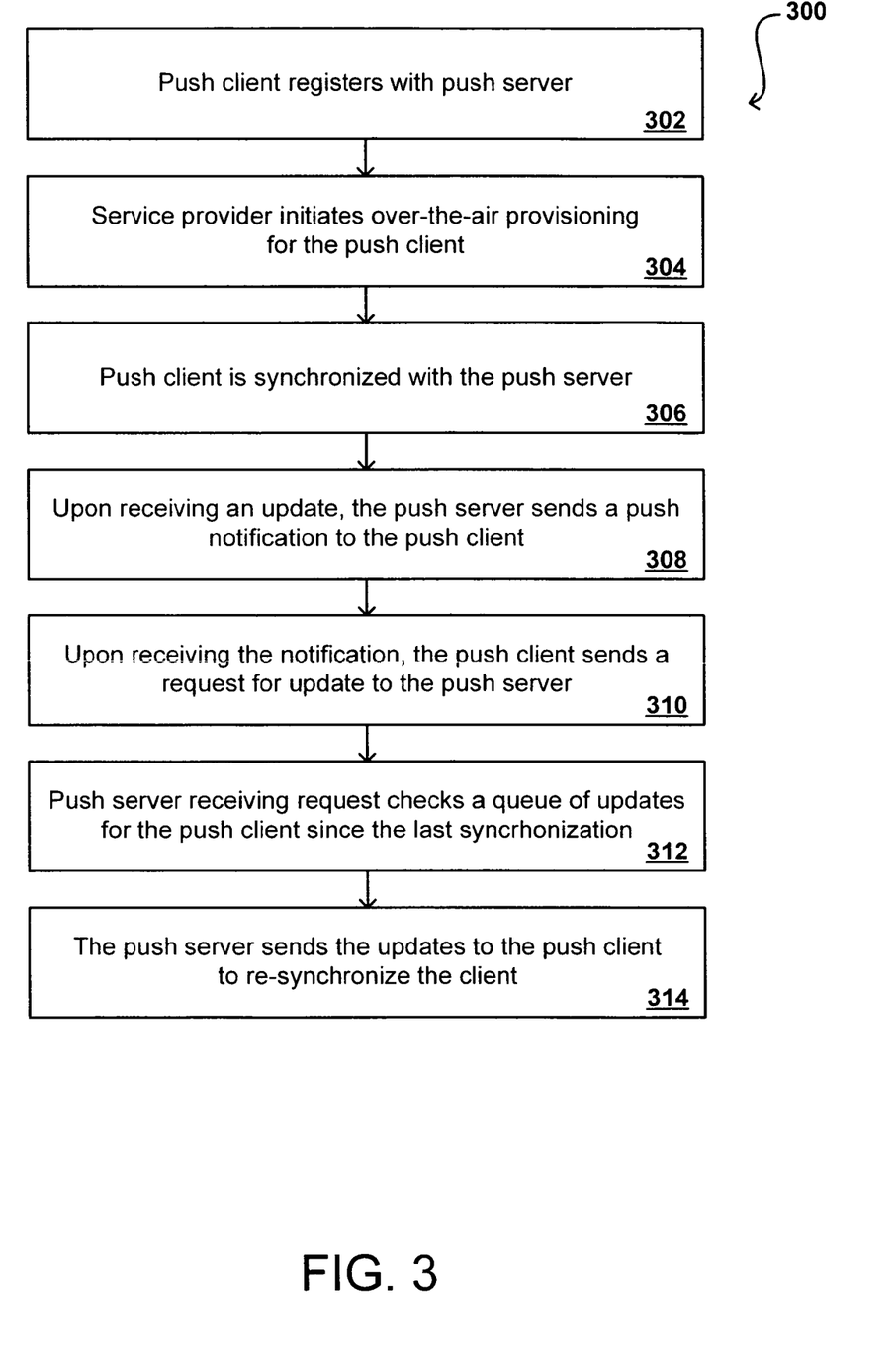
FIG. 3 illustrates steps for a push-email process that can be used in accordance with one embodiment of the present invention.

FIG. 3 illustrates steps of an exemplary method 300 that can be used with a system such as that shown in FIG. 2 to push e-mail information to a client device in accordance with one embodiment. When a push client first accesses the P-IMAP system, such as through a service provider's Web site, the client can register with the system 302. The service provider then can initiate over-the-air (OTA) provisioning of an email client on the new device by sending an SMS which can include an appropriate uniform resource locator (URL) 304. The user can click on the URL, triggering a download and configuration sequence on the mobile device. In other embodiments, the email client can be preinstalled on the device. Once the client is installed and configured, the user can choose a password and can access any e-mail messages, as specified by any user preferences. Any action on the mobile device, such as read, delete, move, or any other action by the email client, is securely sent to the email server, via the same data channel or another channel (e.g., SMS). The email server, in turn, is updated based on the users' preferences and actions on the device.

After the user first connects with the e-mail server, the e-mail client on the mobile device should be synchronized with the e-mail data for the email server 306. Subsequently, any update received by the mail server can cause the push server to generate push notification to the client device 308. If the device is already connected with the gateway, the notification can be pushed through the existing channel. If the device is not connected with the gateway, the notification can be pushed to the email client on the device using a push enabler.

When the e-mail client receives the update notification, which can be after any amount of time depending on factors such as connectivity, the client can send a request for the update to the push gateway 310. The gateway can receive the request to a synchronization server, which can check a list or queue of changes or updates since the client last synchronized with the email server 312. The synchronization server then can send the updated information to the client, so that the client is again synchronized with the email server 314.

Each time the client requests an update, synchronized with the email server, or otherwise accesses the email server, a presence server on the gateway can receive an indication of the activity, and can store information about the request in a log, table, list, database, or other appropriate storage location. As discussed above, this can include information about all user activity, the last user activity, any user activity within a recent period of time, or any other appropriate selection.

Figure 4A:
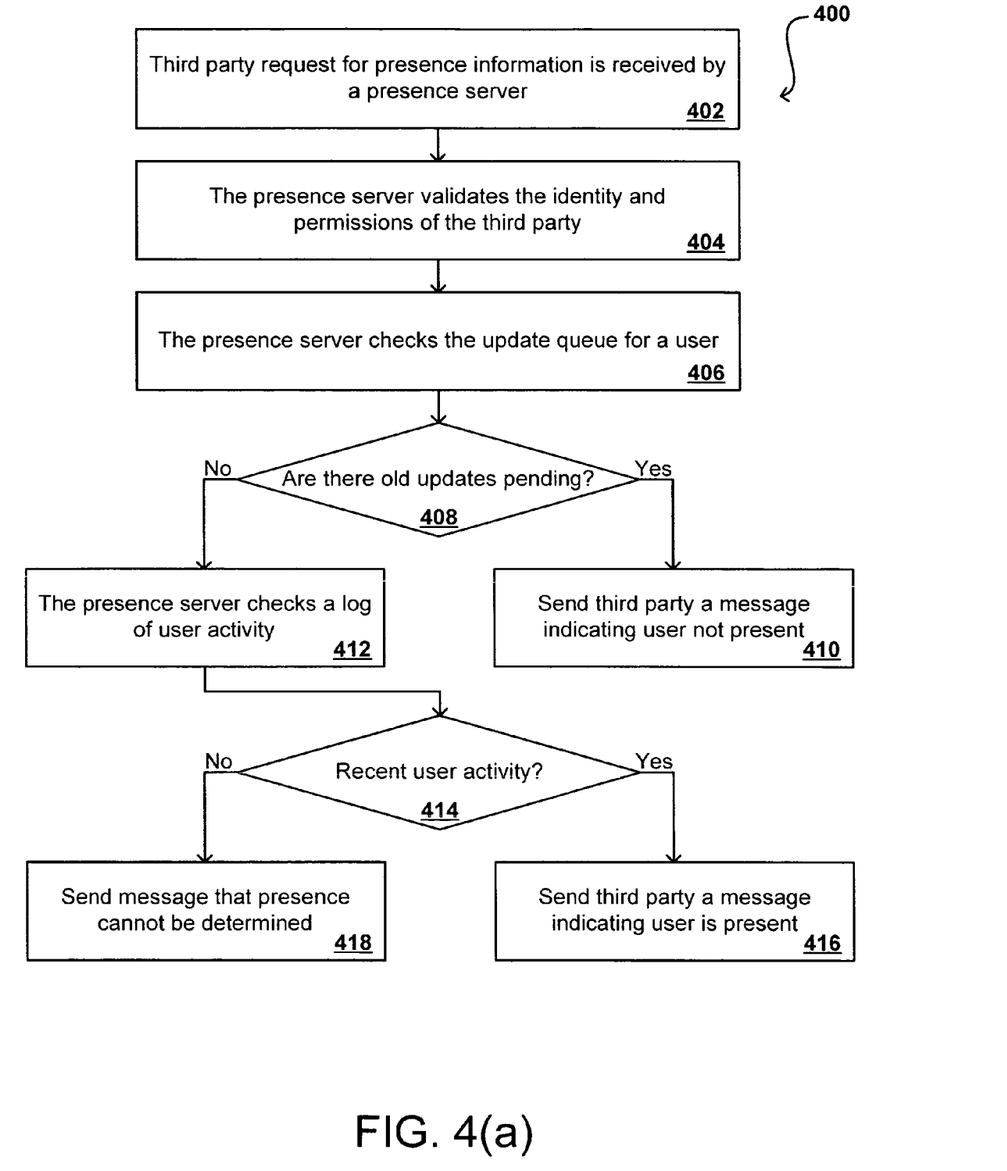
Figure 4B:
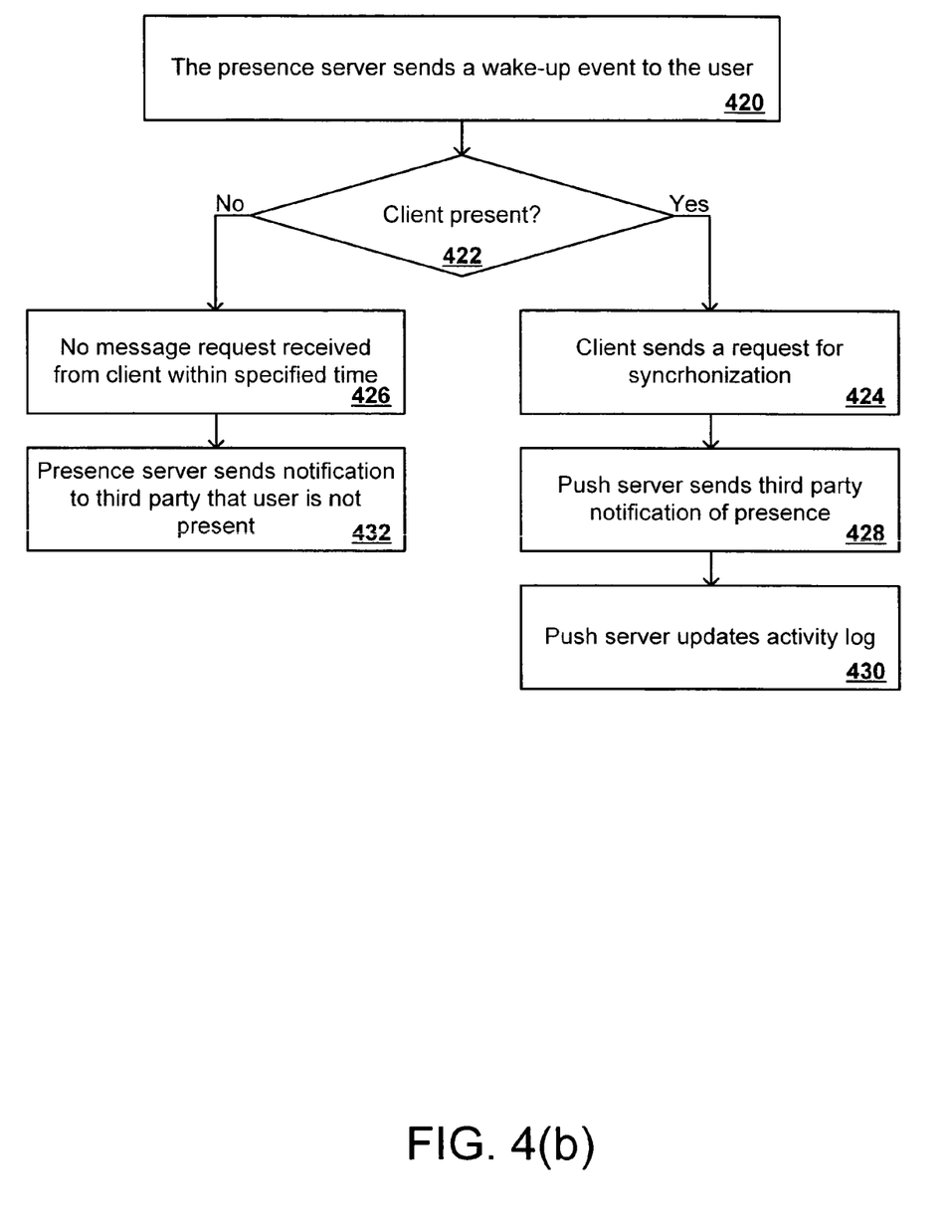

FIGS. 4(*a*) and (*b*) illustrate steps of an exemplary method by which a third party can utilize a system such as that of FIG. 2 with functionality such as described with respect to FIG. 3 to infer network presence in accordance with one embodiment. A third party wishing to obtain presence information for the client can send a request to the push gateway, which is routed to the presence server 402. While referred to herein as a presence server, it should be understood that the presence server may in fact be a presence agent, presence module, presence application, or any other device or application capable of determining or inferring presence for at least one user, client, or other entity or device. The presence server can validate the identity and permissions of the third party, and determine if the third party is authorized to receive presence information about the client 404. In some embodiments, a third party gains access to presence information by registering or subscribing with a presence service.

If the third party is authorized to receive presence information, the presence server can check the activity information or email queue for the user whose presence is requested 406. In one embodiment, the presence server contacts the email server to determine if any information is waiting in a queue to be sent to the client. If there is information in the queue that have been pending past a specified period of time 408, such as being at least five minutes old (or any other appropriate time period), then the presence server determines that the user is not present and sends the presence information back to the third party 410. If there is no information in the queue, or the information is not sufficiently old, the presence server may not yet be able to infer presence.

After checking the e-mail update queue, or instead of checking the queue in some embodiments, the presence server can optionally check a log of activity for the client with respect to the email server and/or the push gateway 412. If the user has logged activity within a certain amount of time 414, such as within about five minutes ago, the presence server might infer that the user is present and send this information to the third party 416. If the user does not have any recent activity, the presence server in one embodiment can send this information to the third party and/or infer that the user is not present, or the presence cannot be determined 418.

In cases where the presence of the user cannot be determined, instead of sending a notification to the third party that the presence cannot be determined as illustrated in step 418, the presence server can request that the push email server send a "wake-up" notification to the client in order to elicit a response from the client 420, as illustrated in FIG. 4(b). If the client has an existing connection with the gateway, the push server can push the notification over an existing channel. If there is no existing connection, the push server can use a push enabler to send the wake-up notification to the client. If the client is present on the network 422, the client will send a request to the push gateway requesting the update from the email server, initiating a synchronization procedure 424. If the client is not present on the network, the push gateway will not receive an update request from the client 426. If the push gateway receives a request from the user, the presence server can send an indication, such as an email message or other indicia, that the user is present on the network 428. The presence server also can update an activity log 430 (if so utilized). If the push gateway does not receive an update request within a specified amount of time, such as about 30 seconds, then the push gateway can send an indication to the third party that the client is not present on the network 432. The selection and configuration of times for expiring past presence hints are described, for example, in co-pending U.S. patent application Ser. No. 11/424/451, filed Jun. 15, 2006, entitled "Past Presence Hints," which is incorporated by reference above.

Figure 5:
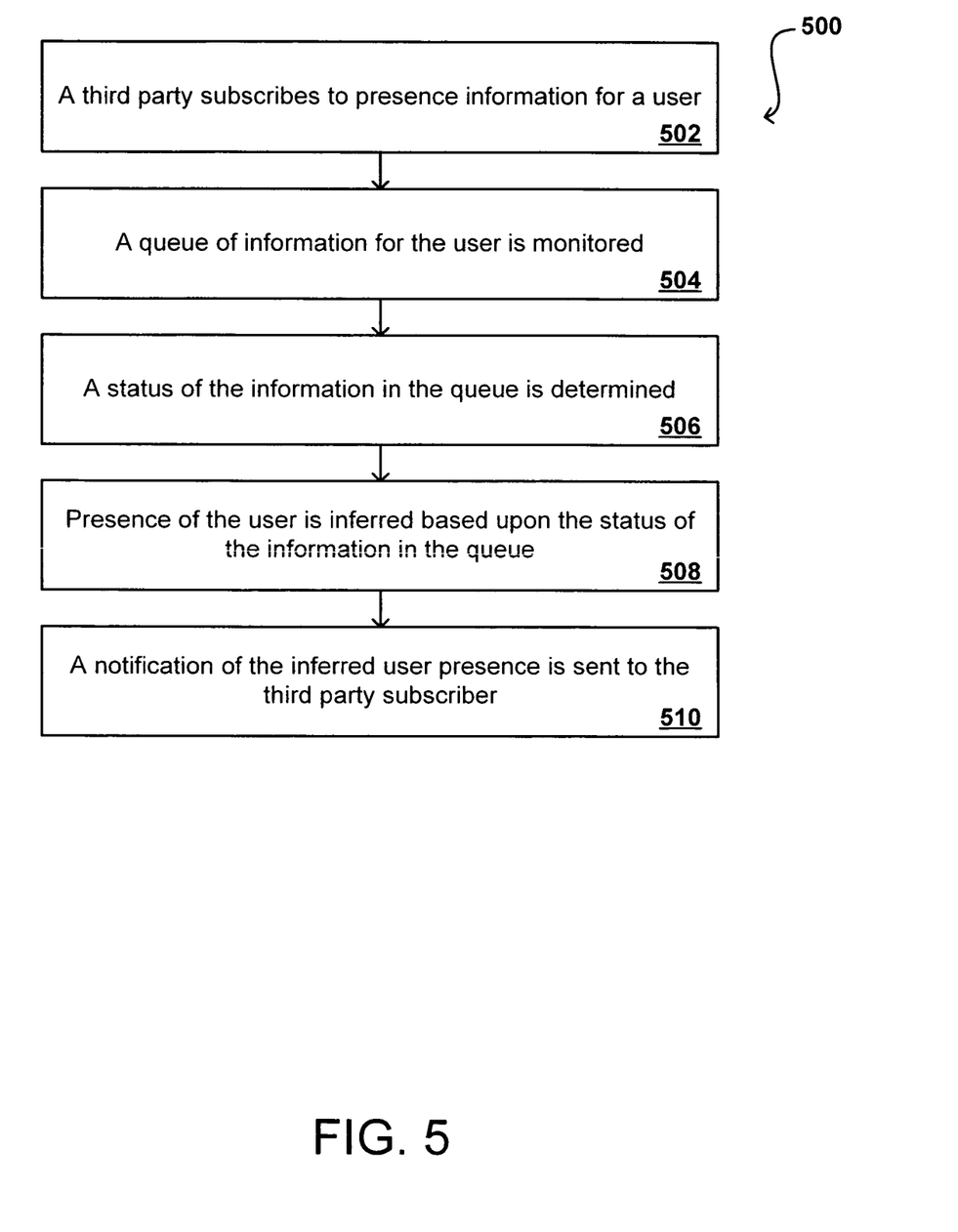
FIG. 5 illustrates steps for a presence notification process that can be used in accordance with one embodiment of the present invention.

In a method 500 in accordance with another embodiment, the third party subscribes to presence information for a user in order to automatically receive updates regarding changes in presence for a user 502. Changes in presence can be detected, for example, by monitoring a queue of information for a user 504 and determining a status of the queue 506, such as whether the queue is growing, whether the queue is checked, or whether there is no change to the queue. A determination of presence for the user then is made 508 based on the status of the queue for the user. The subscriber receives notification of any presence changes for the user 510. Similarly, it is possible to send periodic notifications or periodically check whether the inferred presence is still the same, and notify the third party subscriber of any changes. If the presence cannot be determined, the presence server can request that the push email server send a notification to the client in order to elicit a reaction from the user. If the user (or user device) is present on the network, the user will react to the notification, such as by sending a request to the push gateway requesting the update from the email server. If the user is not present on the network, the user will not react. The presence server then can infer network presence based on whether or not the user reacts. The presence server also can update an activity log (if so utilized).

For the push enabled email server, the P-IMAP client is in the mobile operator or service provider network or in a host network where the client is allowed to roam. The P-IMAP gateway and the email server are within an email provider domain (e.g., Enterprise, Service Provider, etc.). Mobile enablers are exposed by the Mobile Operator or Service Provider to the P-IMAP gateway.

The push client can be in the mobile operator network, service provider network, or in a host network where the mobile device hosting the client is allowed to roam. Mobile enablers can be exposed by the network operator or service provider to the push gateway. The e-mail server can be within an email provider domain (e.g., an Enterprise or service provider domain). The push gateway can be within a third party domain, or can be within the mobile operator network or service provider network, with mobile push mail enabled by the operator or service provider.

There are many other applications and services that can be utilized to obtain presence information. Any application or service that contacts a client device for any reason, and/or that is contacted by a client device for any reason, can be used to infer presence by examining the activity or interaction of the user or client device with that application or service, or with something else that can be monitored such as another application or service. For example, applications such as calendaring, provisioning, and data synchronization can allow for presence determinations. Further, applications that push items such as current pricing and inventory can be utilized to infer presence. Applications such as email can be preferred due to the relatively high amount of e-mail traffic, but other such applications can provide at least some indication of presence using the techniques and embodiments described above.

Figure 6:
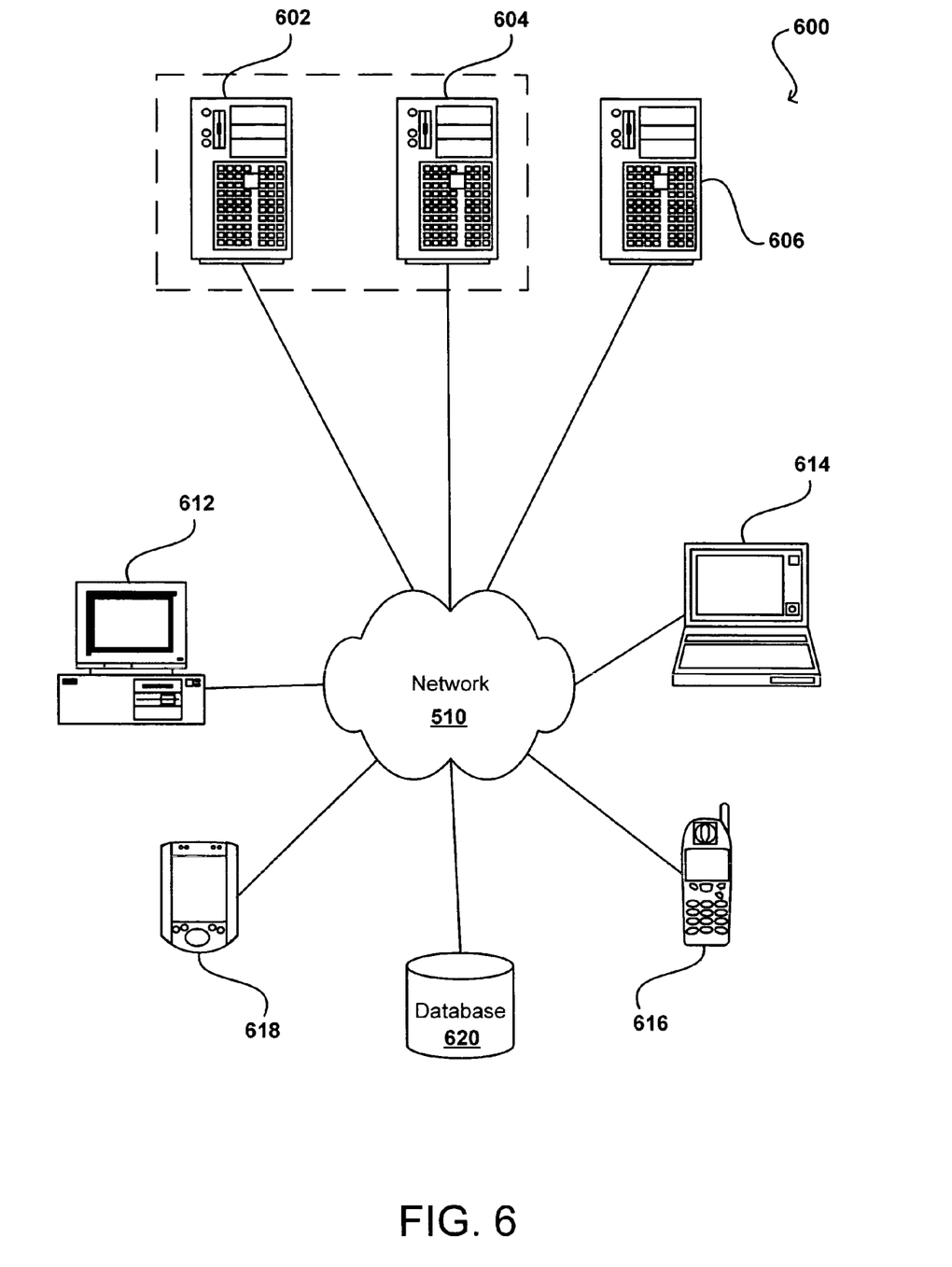
FIG. 6 illustrates components of a computer network that can be used in accordance with one embodiment of the present invention.

FIG. 6 is a block diagram illustrating components of an exemplary operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running various versions of Microsoft Corp.'s Windows and/or Apple Corp.'s Macintosh operating systems), cell phones or PDAs (running software such as Microsoft Corp.'s Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the exemplary system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10 g, that is adapted to store, update, and retrieve data in response to SQL-formatted commands.

Figure 7:
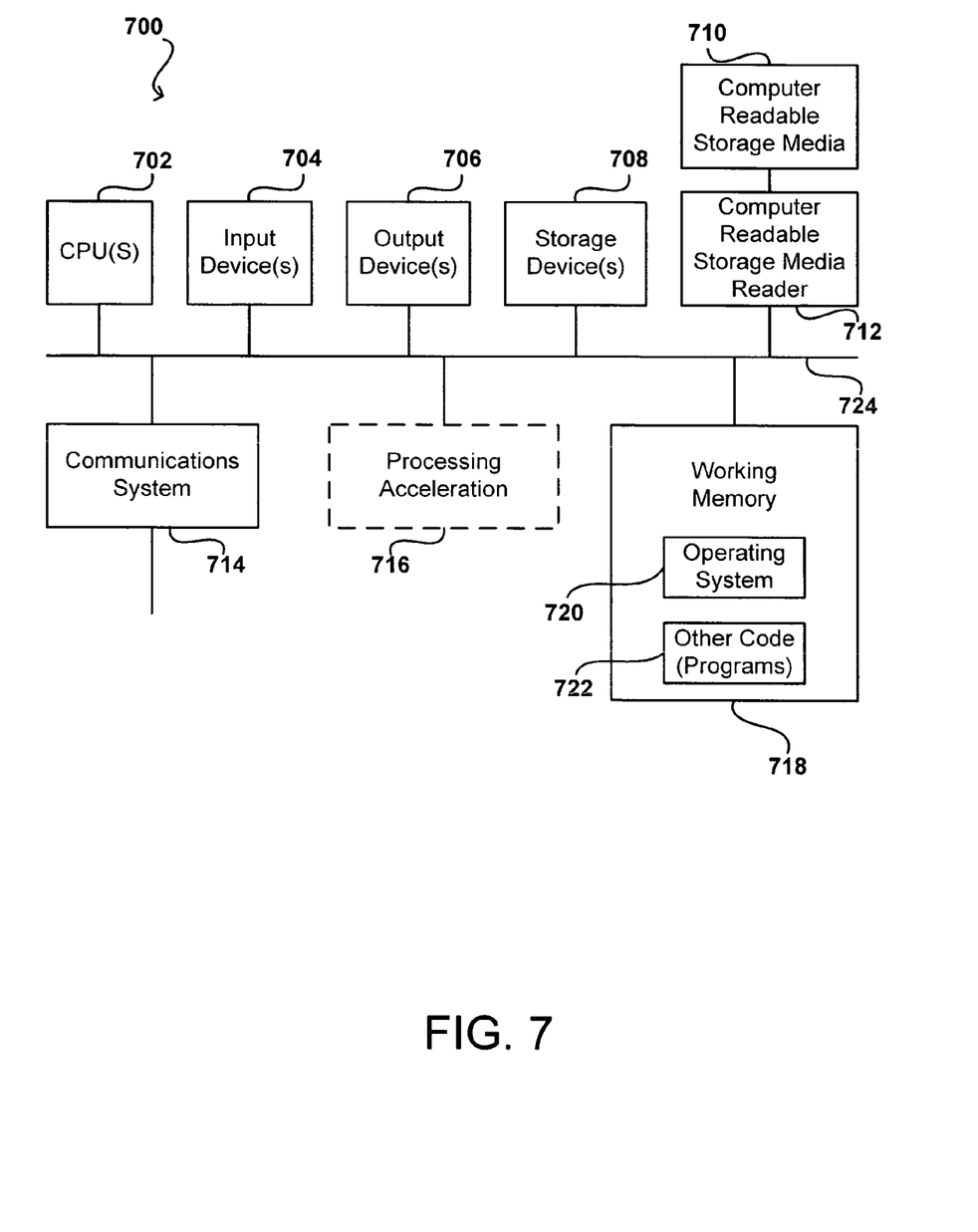
FIG. 7 illustrates components of a computerized device that can be used in accordance with one embodiment of the present invention.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for inferring network presence of a user, comprising:

maintaining in a Personal Information Manager (PIM) server a synchronization queue maintained by the PIM server for a device of a user and containing information available to the user and information indicating a change or update to PIM data on the PIM server since the user last accessed the PIM server, wherein the synchronization queue is used to synchronize the device of the user with the PIM server;

providing with a presence server a presence service to which third parties can subscribe wherein the presence service is independent of a network service and the PIM server does not execute a presence client;

checking the synchronization queue of the PIM server with the presence server for information available to the user;

inferring a current network presence of the user with the presence server based on whether there is information relating to the user in the synchronization queue of the PIM server, a time limit since a last synchronization with the PIM server by the user, and a reaction of the user to the information;

detecting by the presence server a change in the network presence of the user based on said inferring the current network presence; and sending a notification from the presence server to one or more subscribers to the presence service for the user in response to said detecting a change in the network presence of the user, the notification containing an indication of the inferred current network presence.

2. A method according to claim 1, wherein:
sending a notification to any subscribers occurs when there is a change to the amount of information in the queue.

3. A method according to claim 1, wherein:
sending a notification to any subscribers occurs when there is a change to the inferred current presence for the user.

4. A method according to claim 1, wherein:
inferring current network presence is further based on a length of time any information has been pending in the queue and the time limit since the last synchronization with the PIM server by the user.

5. A method according to claim 1, further comprising:
sending a notification from the presence server to one of the user and a user device for the user; and
further inferring current network presence of the user with the presence server based on the occurrence of a reaction to the notification.

6. A method according to claim 1, further comprising:
maintaining a log of user activity in the storage device; and
further inferring current network presence of the user with the presence server based on the log of user activity.

7. A method according to claim 3, wherein:
inferring current network presence is further based on a length of time since a last activity entry in the log of user activity.

8. A system for inferring network presence of a user, comprising:
a Personal Information Manager (PIM) server configured to maintain a synchronization queue for a device of a user, the synchronization queue containing information indicating a change or update to PIM data on a PIM server since the user last accessed the PIM server, wherein the synchronization queue is used to synchronize the device of the user with the PIM server, wherein the PIM server does not operate a presence client application, and wherein the PIM server comprises a processor and a memory; and
a presence server independent of the PIM server that provides a presence service to which third parties can subscribe, wherein the presence server comprises a processor and a memory;
wherein the presence server is configured to check the synchronization queue of the PIM server for information available to the user; and
wherein the presence server is operable infer current network presence of the user based on whether there is information available to the user in the synchronization queue of the PIM server, a time limit since a last synchronization with the PIM server by the user, and a reaction of the user to the information, detect a change in the network presence of the user based on the inferred current network presence, and send a presence notification to a third party containing an indication of the inferred network presence.

9. A system according to claim 8, wherein:
the presence server is further operable to provide a presence service to third parties, the presence server sending the presence notification to any third party subscribing to the presence service for the user.

10. A system according to claim 8, wherein:
the presence server sends the presence notification to any third party requesting presence information for the user.

11. A system according to claim 8, wherein:
the presence server is further operable to infer current network presence based on a length of time any information for the user has been pending in the queue.

12. A system according to claim 8, wherein:
the presence server is further operable to check a log of user activity and further infer current network presence of the user based on the log of user activity.

13. A system according to claim 12, wherein:
the presence server is further operable to infer current network presence based on a length of time since a last activity entry in the log of user activity.

14. A system according to claim 8, wherein:
the presence server is further operable to send a notification to the user and further infer current network presence of the user based on whether the user reacts to the notification.

15. A system according to claim 14, wherein:
the presence server is further operable to infer current network presence based on a length of time between the sending of the notification and a receiving of an update request from the user.

16. The method of claim 1, further comprising:
maintaining in an email server a synchronization queue maintained by the email server for a device of the user and containing information available to the user and information indicating a change or update to email data on the email server since the user last accessed the email server, wherein the synchronization queue is used to synchronize the device of the user with the email server and wherein the email server does not execute a presence client; and
checking the synchronization queue of the email server with the presence server for information available to the user, wherein inferring the current network presence of the user with the presence server is further based on whether there is information relating to the user in the synchronization queue of the email server, a time limit since a last synchronization with the email server by the user, and a reaction of the user to the information and wherein the time limit since a last synchronization with the PIM server and the time limit since a last synchronization with the email server are different.

* * * * *

UNITED STATES PATENT AND TRADEMARK OFFICE
CERTIFICATE OF CORRECTION

PATENT NO. : 8,688,822 B2  Page 1 of 1
APPLICATION NO. : 11/481440
DATED : April 1, 2014
INVENTOR(S) : Maes It is certified that error appears in the above-identified patent and that said Letters Patent is hereby corrected as shown below:

In the Specification

In column 3, line 46, delete "n" and insert -- in --, therefor.

In column 6, line 39, delete "that that" and insert -- that --, therefor.

Signed and Sealed this
Thirtieth Day of September, 2014

Michelle K. Lee
*Deputy Director of the United States Patent and Trademark Office*